Patented Dec. 14, 1948

2,456,586

UNITED STATES PATENT OFFICE 2,456,586

2-BUTOXYETHYL FLUOROACETATE

Ingenuin Hechenbleikner, Norwalk, Conn., assignor to American Cyanamid Company, New York, N. Y., a corporation of Maine No Drawing. Application December 3, 1946, Serial No. 713,818

1 Claim. (Cl. 260—487)

The present invention relates to 2-butoxyethyl fluoroacetate, a new compound, and a method for making the same.

It has been discovered that 2-butoxyethyl fluoroacetate may be prepared in good yield by reacting together ethyl fluoroacetate and 2-butoxyethanol in the presence of p-toluenesulfonic acid.

The reaction may be illustrated by the following equation:

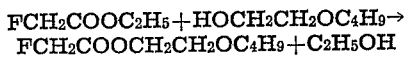

The following example illustrates one mode of carrying out the invention. The parts are by weight.

Example

A mixture consisting of 5.3 parts of ethyl fluoroacetate, 11.8 parts of 2-butoxyethanol and .05 part of p-toluenesulfonic acid was heated gradually to a temperature of about 180° C. during a period of about 3 hours in a reaction vessel equipped with a stirrer, thermometer and a Vigreux column surmounted by a reflux stillhead, the latter for the purpose of distilling off the ethanol as it was liberated. The crude product was washed twice with water, and then distilled under vacuum giving 8 parts of 2-butoxyethyl fluoroacetate, a colorless liquid boiling at 95°–100° C./5 mm.

2-butoxyethyl fluoroacetate possesses insecticidal, rodenticidal and fungicidal properties.

While the invention has been described with particular reference to specific embodiments, it is to be understood that it is not to be limited thereto but is to be construed broadly and restricted solely by the scope of the appended claim.

I claim:

2-butoxyethyl fluoroacetate.

INGENUIN HECHENBLEIKNER.

REFERENCES CITED

The following references are of record in the file of this patent:

UNITED STATES PATENTS

| Number | Name | Date |
|---|---|---|
| 2,120,755 | Kyrides | June 14, 1938 |
| 2,257,021 | Pollack | Sept. 23, 1941 |
| 2,409,859 | Horsfall | Oct. 22, 1946 |